United States Patent [19] [11] Patent Number: 4,996,497
Waehner [45] Date of Patent: Feb. 26, 1991

[54] CABLE COMPENSATION CIRCUIT

[75] Inventor: Glenn C. Waehner, New Canaan, Conn.

[73] Assignee: American Dynamics Corporation, Orangeburg, N.Y.

[21] Appl. No.: 361,404

[22] Filed: Jun. 5, 1989

[51] Int. Cl.$^5$ .......................... H03F 1/00; H03H 5/00
[52] U.S. Cl. ..................... 330/151; 330/304; 379/398; 333/28 R
[58] Field of Search ...................... 330/126, 151, 304; 333/28 R; 379/398

[56] References Cited

U.S. PATENT DOCUMENTS

| | | | |
|---|---|---|---|
| 3,456,206 | 7/1969 | Kwartiroff et al. | 330/32 |
| 3,568,100 | 3/1971 | Tarbox | 333/18 |
| 4,099,022 | 7/1978 | Fullerton et al. | 178/63 |
| 4,273,963 | 6/1981 | Seidel | 179/16 |
| 4,329,655 | 5/1982 | Nojima et al. | 330/149 |
| 4,450,555 | 5/1984 | Pays | 370/31 |
| 4,479,228 | 10/1984 | Crane | 375/7 |

OTHER PUBLICATIONS

Cordell, "A New Family of Active Variable Equilizers", *IEEE Transactions on Circuits and Systems*, vol. CAS-29, No. 5, May 1982, pp. 316-322.

*Primary Examiner*—James B. Mullins
*Attorney, Agent, or Firm*—Peter L. Michaelson

[57] ABSTRACT

Circuitry is disclosed which compensates for magnitude and phase variations in the transfer function of a transmission medium. The medium is characterized by amplitude and phase variations in its transfer function wherein the amplitude variations produce increasing loss in the medium as frequency increases. The circuitry possesses an inverse characteristic to these variations, thereby generating a relatively flat magnitude characteristic for the medium-circuitry combination. The circuitry includes a buffer amplifier that receives a portion of an input signal, a network coupled to the amplifier and having zero-pole pairs in its signal transfer function, and a summer which has both the input signal and the output of the network as inputs. Accordingly, the compensation circuit has an overall transfer function which has fixed poles but adjustable zeros, these zeros being dependent on the amplifier gain and the portion of the input signal applied to the amplifier.

14 Claims, 5 Drawing Sheets

CABLE COMPENSATION CIRCUIT

FIELD OF THE INVENTION

This invention relates generally to signal compensation circuitry and, more particularly, to circuitry which compensates for distortion of a signal that propagates through a lossy cable medium.

BACKGROUND OF THE INVENTION

Every type of cable medium, such as a twisted-wire pair used in telephone systems or a coaxial cable used in television (TV) systems, exhibits a frequency-dependent transfer function. The transfer function is one fundamental way to characterize the medium and may be advantageously used to determine the signal at the output of the cable for a given signal applied to the input of the cable.

A cable is a non-ideal transmission medium inasmuch as the cable introduces distortion into a signal propagating therethrough. This distortion is effected by amplitude and phase variations of the transfer function over the frequency range of the input signal. For example, for a rectangularly-shaped pulse signal, these variations result in a "smearing" or spreading of the pulse in time as well as a reduction in the peak of the pulse. An ideal but virtually non-realizable transfer function has a uniform or flat am characteristic and a linear phase characteristic over, at least, the frequency range of the input signal. With such a transfer characteristic, the output signal is a delayed version of the input signal differing only in the peak level.

Conventionally, in telephone systems, to correct for a non-ideal cable transfer function, a complex network using many components to compensate for standard lengths of cable (e.g., half-mile, one mile) was developed. The correction took the form of smoothing the amplitude characteristic and linearizing the phase characteristic so as to approximate the ideal transfer function characteristic. Since the complex network introduced additional loss or amplitude attenuation into the cascade connection of the cable and correction network, the network usually included a gain device. When the cable length was non-standard, a so-called "buildout" network was used in combination with the complex network. The buildout network included numerous circuit elements, some of which can be adjusted or set, to transform the odd length to a standard length for standard compensation. Since the buildout network typically was passive, it increased the actual electrical length of the cable to a longer standard length. Also, because of the limited number of settings for the buildout network, precise compensation was often not achieved, thereby resulting in only a partial compensation.

With respect to TV systems, some TV cameras are provided with built-in circuits to compensate for common cable lengths. If the actual cable length does not match that corresponding to one of the built-in compensation circuits, substantial signal distortion may occur. Other ways to overcome the distortion caused by cable lengths include using costly low-loss cables, microwave links or fiber optic cables. It is also possible to design a custom network comprising active and passive components to compensate for the exact cable length for a given installation. This approach is very expensive and requires skilled technicians to design and implement the custom network.

In the prior art of telephony, it is also known to provide an automatic line equalizer which adapts to the particular length and gauge of cable to which it is connected. Such an equalizer is disclosed in U.S. Pat. No. 3,568,100 (issued to R. A. Tarbox on Mar. 2, 1971 and hereinafter referred to as the '100 Tarbox patent). This equalizer utilizes an electronically controlled gain circuit responsive to the cable characteristics of the attached cable to adjust the frequency shaping of the gain, thereby providing the necessary frequency shaping for any length or gauge cable coupled to the equalizer. The equalizer has an embedded variable impedance network having only a single pole which is movable in the frequency domain in response to the automatic measurements. This equalizer provides an approximately correct compensation for only the high frequency range of the various cables and lengths in the telephone plant. The arrangement is most suitable for high frequency pulse transmission systems wherein the energy of the cable signal is localized to this high frequency range. The presumption with the circuit disclosed in the '100 Tarbox patent is that low and mid frequency losses are basically linear, but such a presumption is inadequate for systems having significant energy in the lower bands because of the inherently nonlinear low and mid frequency characteristics of cable.

Representative of more recent compensation techniques is the equalization circuit disclosed in U.S. Pat. No. 4,273,963 (issued to H. Seidel on June 16, 1981 and hereinafter referred to as the '963 Seidel patent).

Here, an active network is disclosed which corrects for varying cable lengths in a digital transmission system, that is, a system deploying rectangularly-shaped pulses to convey the non-zero signal or data state. The network disclosed in this patent requires an adjustable amplifying device having a balanced output including both plus and minus output terminals, as well as two frequency dependent paths coupled to the amplifying device, one to each amplifier output terminal. The compensation is a very non-linear function of the amplifier gain and typically requires a technician with great skill to perform cable measurements and then to adjust the equalization network for proper compensation.

Therefore, a need exists in the art for a cable compensation circuit, particularly suited for use with TV cables, that can properly compensate for substantially any normal length of cable, not just pre-selected "common" lengths, and is relatively simple to use and/or adjust and is inexpensive.

SUMMARY OF THE INVENTION

These limitations as well as other shortcomings and deficiencies in the art are obviated, in accordance with the inventive cable compensation circuit which includes a cascade combination of a buffer amplifier and a compensation network. The network has a signal transfer function with one or more zero-pole pairs, and the amplifier receives at its input a controlled portion of the input signal requiring pre-emphasis. The circuitry also includes a summation device having as its inputs both the input signal and the output of the network. With this arrangement, the circuitry itself has a transfer function such that its poles are fixed by the poles of the zero-pole pairs, and the zeros are movable. The locations of the zeros are determined by the portion of the input delivered to the amplifier, the gain of the amplifier, and the zeros of the zero-pole pairs. The magnitude characteristic of this transfer function is adjustable to provide a gain variation which offsets or cancels the loss variations of the cable magnitude characteristic. The cable is connected to the output of the summation device through source and load matching impedances.

In accordance with the illustrative embodiment, three frequency domain regions of the transfer function, namely, the low, middle and high frequency ranges, are the focus of the compensation circuitry. The magnitude and phase characteristics of the compensation circuitry in these ranges are simultaneously altered in response to one adjustable element when the compensation circuitry is adjusted to account for attenuation in these regions.

BRIEF DESCRIPTION OF THE DRAWING

The teachings of the present invention will be clearly understood by considering the following detailed description in conjunction with the accompanying drawings, in which.

To facilitate understanding, identical reference numerals have been used, where possible, to denote identical elements that are common to various figures.

DETAILED DESCRIPTION

Figure 1:
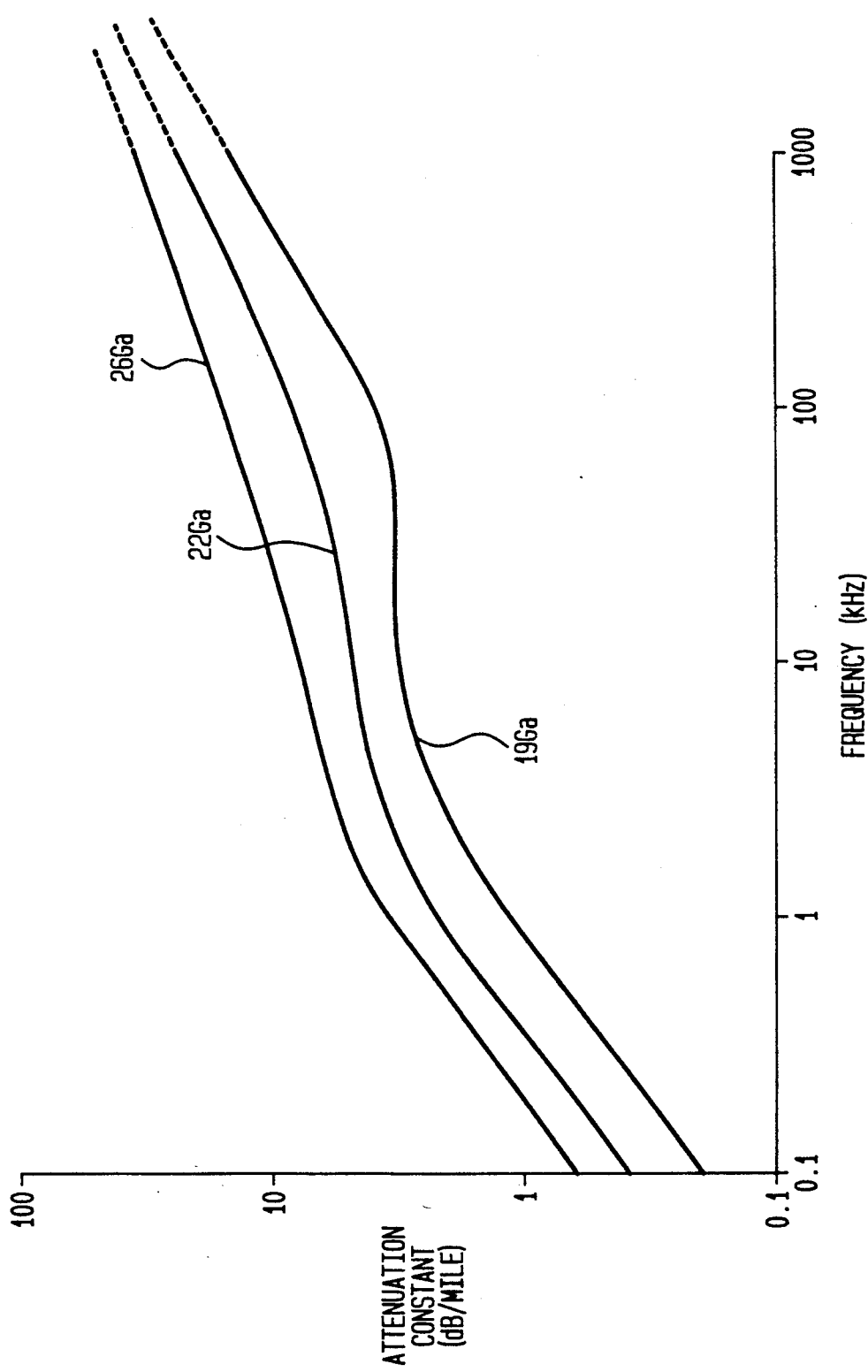
FIG. 1 is a graphical representation of the attenuation constant versus frequency characteristic for various telephone cables.

With reference to FIG. 1, there is shown, for the purpose of illustrating the general loss characteristic of telephone cable, a plot of the attenuation versus frequency characteristics for standard telephone cables of various gauges. In FIG. 1, both the frequency and the attenuation are logarithmically scaled to emphasize frequency shaping. In the low frequency range (up to about 10 kHz), the attenuation for different gauges of this cable appear as sloping straight lines. In this frequency range, the attenuation is approximately proportional to the square root of frequency since the resistance and capacitance are primarily constants which dominate in the low range. In the high range (over 100 kHz), the characteristics are again sloping straight lines which are proportional to the square root of frequency because of skin effect. Between these two ranges is the middle range where the attenuation is not as functionally dependent on frequency.

Figure 2:
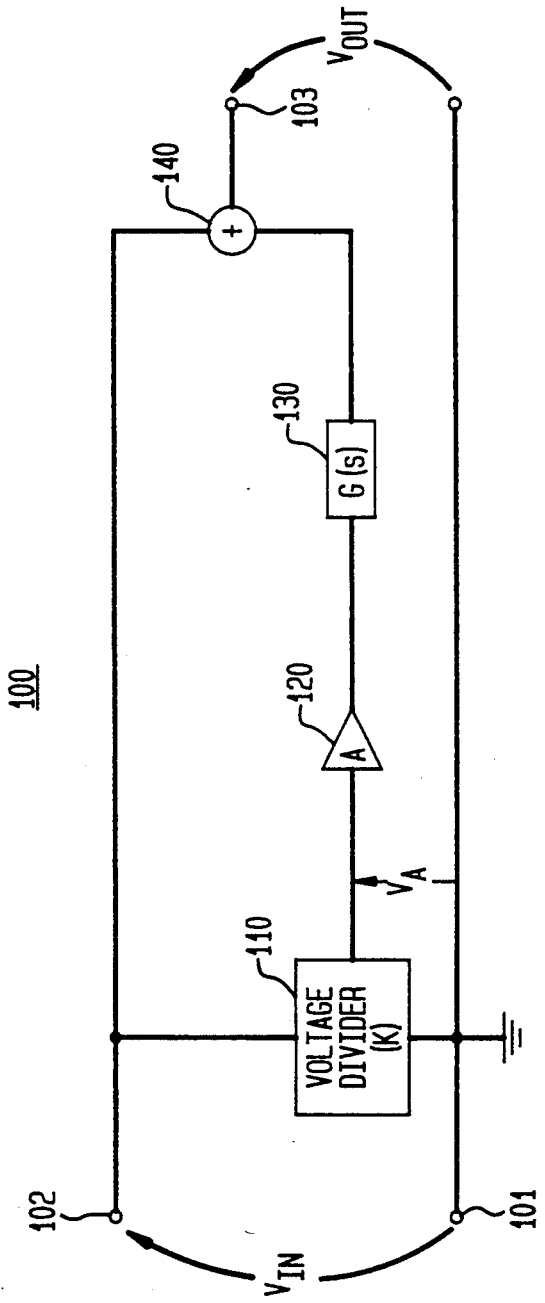
FIG. 2 is a block diagram of the basic compensation circuit in accordance with the present invention.

In accordance with the present invention, an overall compensation circuit is elucidated having a single adjustment for length and a magnitude characteristic which is basically the inverse of the form shown in FIG. 1. Such an inverse characteristic may be referred to as pre- or post-emphasizing the signal applied to the cable medium. FIG. 2 shows a block diagram of illustrative compensation circuitry 100. The following transfer function, which may be readily derived, given $V_{IN}$ being the input voltage appearing at terminal 102, $V_{OUT}$ being the output voltage appearing at terminal 103 and $V_A$ being the output voltage provided by voltage divider 110:

$$\frac{V_{OUT}}{V_{IN}} = 1 + AKG(s), \quad (1)$$

where:

G(s) is the transfer function of network 130, with s $= \alpha + j\omega$ being the complex frequency variable, A is the gain of amplifier 120, and $0 \leq K \leq 1$ is the ratio of $V_A/V_{IN}$.

Summer 140 adds the voltage input $V_{IN}$ to the output of network 130.

Although equation (1) has been derived with reference to the block diagram configuration of FIG. 2, equation (1) is general in that other circuit configurations may also be readily devised so that each has a transfer function expressible in the form of equation (1). The AKG(s) contribution to equation (1) is multiplicative in nature, so the individual terms comprising the contribution and their circuit mechanizations may be ordered in any manner without changing the overall contribution produced by the individual terms.

For the sake of simplicity, but without loss of generality, it is presumed that G(s) assumes the following form:

$$G(s) = \frac{(s + a)(s + c)}{(s + b)(s + d)}. \quad (2)$$

Figure 3:
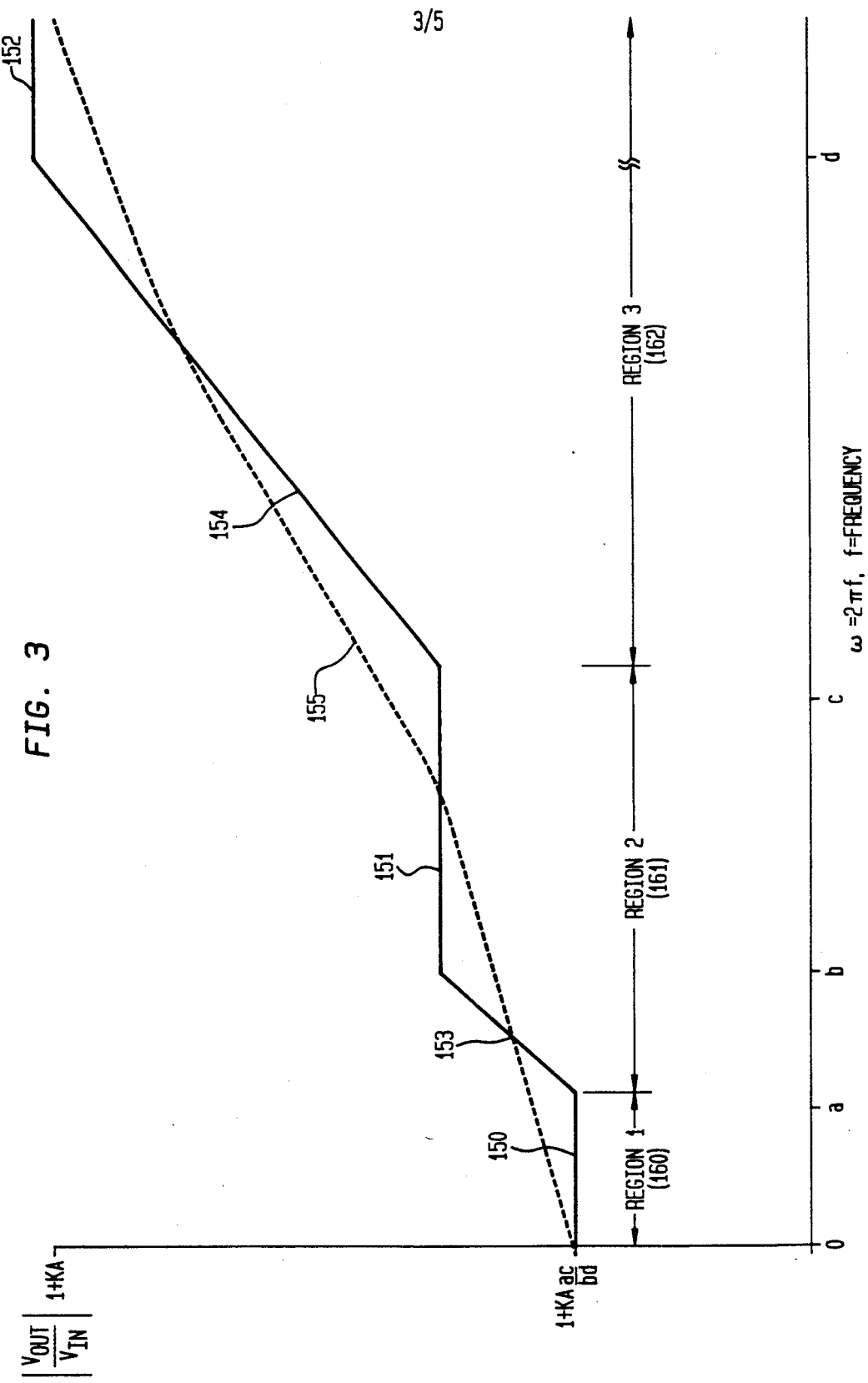
FIG. 3 is a plot of the magnitude of the transfer function for the compensation circuit of FIG. 2 for general values of A and K.

As is evident from this equation, G(s) comprises two zero-pole pairs with $a<b<c<d$. A plot of the magnitude of the transfer function versus radian frequency $\omega$ for compensation network 100, given G(s) of equation (2), is depicted in FIG. 3 by dashed line 155 for arbitrary A and K values. An approximation to the magnitude is given by the three flat line segments 150, 151 and 152, respectively, and transition segment 153 connecting lines 150 and 151 as well as transition segment 154 connecting lines 151 and 152. Three regions 160, 161 and 162 (also shown as Region 1, Region 2 and Region 3, respectively) are generally defined for the transfer function. Region 160 is coextensive with the length of segment 150; region 161 is coextensive with the frequency range encompassed by segments 153 and 151; and region 162 starts at the breakpoint between lines 151 and 154. Generally, region 160 compensates for the low frequency cable loss, region 161 compensates for the mid-range loss and region 162 compensates for the high-frequency cable loss. The general shape of the actual magnitude characteristic 155 is the inverse to the attenuation curve for cable media as shown in FIG. 1. Thus, the cascade combination of compensation circuit 100 and a cable results in a generally flat or uniform amplitude characteristic for the overall cascade combination.

Figure 4:
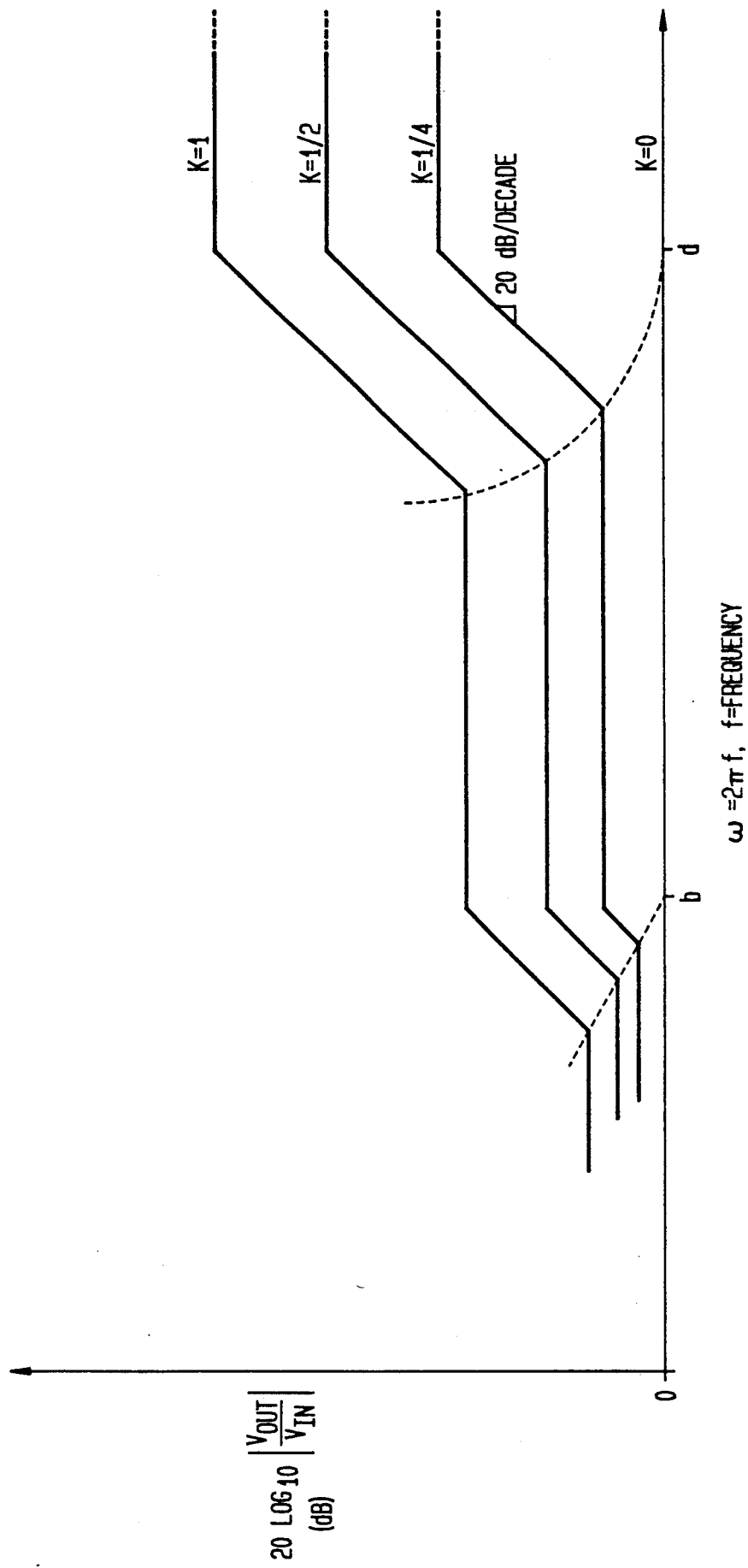
FIG. 4 is a family of plots of the magnitude of the transfer function for the compensation of FIG. 2 wherein A is general and K has the values of 0, $\frac{1}{4}$, $\frac{1}{2}$ and 1, respectively.

The poles of the transfer function of the compensation circuit are determined by the poles of network 130, but the zeros are a function of both K and A. The plot of FIG. 4 shows the manner in which the zeros of the overall transfer function vary as a function of K. In particular, FIG. 4 depicts a family of curves for the magnitude of the transfer function in decibels versus frequency on a logarithmic scale as K takes on the values K=0, ¼, ½ and 1. It is evident that as K increases from 0 to 1, region 160 of FIG. 3 migrates up and to the left or towards a lower frequency on a line, shown dashed, emanating from frequency b. Similarly, the right side of region 161 of FIG. 3 migrates up and to the left or towards a lower frequency on a line, shown dashed, emanating from frequency d. The left hand point of region 162 tracks with the right hand point of region 161. All three regions, both in location and in corrective effect, are controlled simultaneously with the adjustment of K once the values for A, a, b, c and d have been fixed. (For reference purposes, this family of curves is based on the following normalized parameters: a=1, b=4, c=8, d=32 and A=16).

It is also readily apparent to those skilled in the art that three frequency regions are also defined if the transfer function G(s) has two finite zeros (a, c) and one finite pole (b), with a<b<c, so that each finite zero need not necessarily be paired with a finite pole. Thus, the desired compensation circuitry to compensate for the three frequency regions of interest is generally defined by at least two finite zeros and at least one finite pole in its transfer function.

Figure 5:
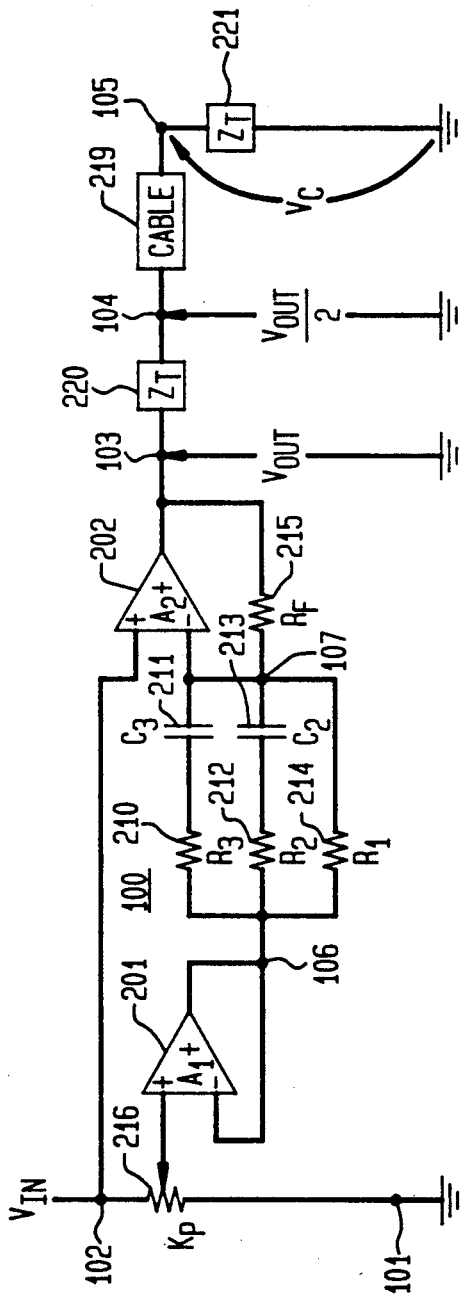
FIG. 5 is a schematic diagram for one realization of the general compensation circuit of FIG. 2 for a coaxial cable application.

Whereas FIG. 2 represents compensation circuitry 100 in general block diagram form, FIG. 5 depicts one realization of circuitry 100 in schematic diagram form. As shown, input voltage $V_{IN}$ appears at node 102 and output voltage $V_{OUT}$ appears at node 103, both voltages being measured with respect to ground node 101.

With respect to FIG. 5, operational amplifier 201 serves to tap a selected portion of voltage $V_{IN}$ developed across resistor 216 and delivers this portion to node 106. The selected portion, designated $K_p V_{IN}$, feeds the positive input to amplifier 201. The quantity $K_p$ has values from 0 to 1; when $K_p = 1$, $V_{IN}$ is applied to the positive input of amplifier 201 and when $K_p = 0$, the positive input is grounded.

With the focus now on amplifier 202, the following general transfer function relationship may be readily derived:

$$V_{(103)} = -V_{(106)} R_F Y + V_{(102)} (1 + R_F Y) \quad (3)$$

where:
  $V_{(102)}$ is the voltage at node 102, hence $V_{(102)} = V_{IN}$,
  $V_{(106)}$ is the voltage at node 106, hence $V_{(106)} = K_p V_{IN}$,
  $V_{(103)}$ is the voltage at node 103, hence $V_{(103)} = V_{OUT}$,
  $R_F$ is the value of feedback resistor 215, and Y is the admittance of the parallel network between nodes 106 and 107 comprising: resistor 210 ($R_3$) in series with capacitor 211 ($C_3$); resistor 212 ($R_2$) in series with capacitor 213 ($C_2$); and resistor 214 ($R_1$).

Equation (3), after substitution of the above relations, may be expressed in the following form:

$$V_{OUT} = V_{IN} + V_{IN} K R_F Y \quad (4)$$

where:
  $K = 1 - K_p$. Hence, K ranges from 0 to 1 as $K_p$ ranges from 1 to 0.

Admittance Y may be expressed as $$Y = Q \frac{(s+a)(s+c)}{(s+b)(s+d)} \quad (5)$$

where:

$$Q = \frac{R_1 R_2 + R_1 R_3 + R_2 R_3}{R_1 R_2 R_3}$$

$$a + c = \frac{C_2(R_1 + R_2) + C_3(R_1 + R_3)}{\Delta}$$

$$ac = \frac{1}{\Delta},$$

$$\Delta = C_2 C_3 (R_1 R_2 + R_1 R_3 + R_2 R_3),$$

$$b = \frac{1}{R_2 C_2}, \text{ and}$$

$$d = \frac{1}{R_3 C_3}.$$

Hence, equation (4) may be written as $$\frac{V_{OUT}}{V_{IN}} = 1 + R_F Q K \frac{(s+a)(s+c)}{(s+b)(s+d)} \quad (6)$$

Comparison of equation (1), with G(s) of equation (2) substituted in equation (1), to equation (6) shows their similarity; in fact, with $A = R_F Q$, the equations are identical.

The particular circuit shown in FIG. 5 corrects for the distortion caused by cable 219. Impedance shown as $Z_T$, namely, elements 220 and 221, serve as input and output terminations, respectively. If $Z_T$ represents the characteristic impedance of the cable, then approximately $V_{OUT}/2$ appears at node 104, that is, at the input to cable 219. The factor of ½ can be compensated for by amplification factor A of circuitry 100. With the overall arrangement of FIG. 5, voltage $V_C$ at node 105 is the compensated output of cable 219.

As an example of component values, a video or TV application is considered. The values are: $R_1 = 470$ ohms; $R_2 = 270$ ohms; $R_3 = 220$ ohms, $R_F = 470$ ohms; $C_2 = 6800$ picofarads; and $C_3 = 910$ picofarads. Then A = 4.83, and $a = 189.6 \times 10^3$ rad./sec. or 30.18 kHz; $b = 544.7 \times 10^3$ rad./sec. or 86.69 kHz; $c = 2.969 \times 10^6$ rad./sec. or 472.53 kHz; and $d = 4.995 \times 10^6$ rad./sec. or 794.98 kHz.

Figure 6:
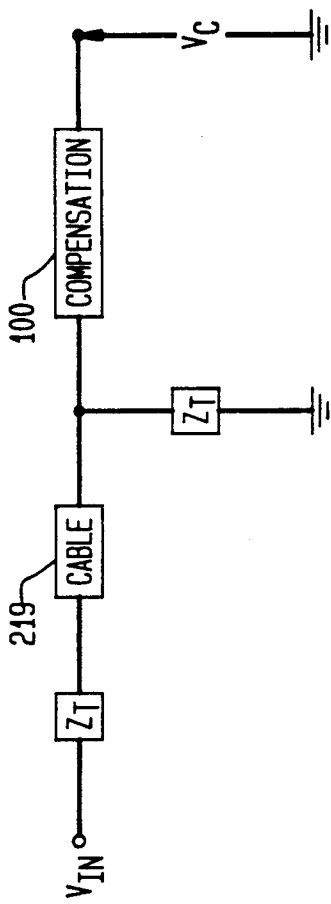
FIG. 6 is illustrative of the arrangement wherein the compensation circuit terminates a cable.

Whereas the component values presented above exemplify one particular application of the principles of the invention, one of ordinary skill in the art may now advantageously select other values depending upon the desired application because of the teachings of the present invention. Moreover, it is also clear that more zero-pole pairs may be readily added to compensation circuit 100 merely by augmenting admittance Y with series resistor-capacitor elements placed across nodes 106 and 107. In addition, it is also apparent that modifications to FIG. 5 may be readily appreciated by those of skill in the art. For example, operational amplifier 201 may be replaced by an emitter follower circuit and circuit 100 functions in substantially the same manner. Also, the compensation circuitry of FIG. 5 may be employed at the far-end or the receiver end of a cable, in contrast to the arrangement shown in FIG. 5 wherein the compensation circuitry serves as an input to the near-end or the transmitter end of the cable. In this alternative arrangement, the input source $V_{IN}$ is delivered to the compensation circuit through an impedance of value $Z_t$; FIG. 6 depicts this alternative arrangement.

Thus, it is to be further understood that the apparatus and methodology described herein are not limited to specific forms by way of illustration, but may assume other embodiments limited only by the scope of the appended claims.

What is claimed is:

1. Circuitry for compensating an input signal comprising:
   a network, responsive to the input signal, having a network transfer function of the form AKG(s), where A is a gain factor, K represents a selected portion of the input signal and G(s) represents a function of complex frequency s characterized by at least two finite zeros (a, c) and at least one finite pole (b) with a <b <c; and a summation device having as inputs both the input signal and an output providing said network transfer function from said network,
   wherein the circuitry has an overall transfer function, obtained at an output of said device, characterized by poles that are the poles of said network and zeros that are determined by A, K and said at least two zeros, and wherein A, K, said at least two finite zeros and said at least one finite pole are chosen to provide variations in the input signal over pre-determined frequency regions of the input signal.

2. The circuitry as recited in claim 1 wherein said overall transfer function has the form 1+AKG(s).

3. The circuitry as recited in claim 2 wherein said network further comprises a cascade combination of an amplifier having said factor A as its gain factor and a compensation network providing said function G(s).

4. The circuitry as recited in claim 3 wherein said amplifier is adapted to receive at its input said selected portion of the input signal.

5. The circuitry as recited in claim 4 wherein said amplifier is single-ended and non-inverting.

6. Circuitry for compensating an input signal comprising:
   a combination of amplifier means and a compensation network having a transfer function with a plurality of zero-pole pairs, said amplifier means adapted to receive a selected portion of the input signal; and
   a summation device having as its inputs both the input signal and the output signal of said compensation network,
   wherein the circuitry has an overall transfer function available at the output of said device such that its poles are the poles of said network and its zeros are determined by (i) the gain of said amplifier means, (ii) said zeros of said compensation network and (iii) said selected portion, and wherein said gain and said selected portion are chosen to provide variations in the input signal over pre-determined frequency regions of the input signal.

7. The circuitry as recited in claim 6 wherein said amplifier means are single-ended and non-inverting.

8. The circuitry as recited in claim 6 further comprising a voltage divider for tapping the input signal to derive said selected portion.

9. Circuitry for pre-emphasizing an input signal to generate a pre-emphasized signal, the circuitry comprising:
   means for generating a selected portion of the input signal;
   an operational amplifier having plus and minus inputs and an output supplying the pre-emphasized signal, the input signal being applied to said plus input;
   a feedback element connecting said output with said minus input; and
   a network having a transfer function composed of a plurality of zero-pole pairs, with said selected portion as its network input and having its network output connected to said minus input.

10. The circuitry as recited in claim 9 wherein said means for generating comprises a second operational amplifier having positive and negative inputs and a second output and wherein a portion of the input is supplied to said positive input, and said negative input and said second output are interconnected, said second output providing said selected portion of the input signal.

11. The circuitry as recited in claim 9 further comprising a voltage divider for tapping the input signal to provide said selected portion of the input and wherein said means for generating includes a second operational amplifier having positive and negative inputs and a second output and wherein said voltage divider is coupled to said positive input, and said negative input and said second output are interconnected, said second output providing said selected portion of the input signal.

12. The circuitry as recited in claim 11 wherein said voltage divider is variable so that said selected portion is adjustable.

13. Circuitry for compensating an input signal comprising:
   a voltage divider for tapping a selected portion, having a value K, of an input signal ($V_{IN}$);
   buffer amplifier means having said selected portion as its input and a gain A;
   a compensation network, coupled to the output of said amplifier means, said network having a transfer function with two zero-pole pairs; and
   a summation device having as its inputs both the input signal and the output of said network,
   wherein the output of said device has pre-defined amplitude variations over a frequency range of the input signal; said pre-defined variations being determined by the combination of the gain of said amplifier, said zero-pole pairs and said selected portion; and wherein said transfer function of the network is of the form $$\frac{(s+a)(s+c)}{(s+b)(s+d)}$$

with a <b <c <d, where a and c are zeros and b and d are poles and s is the complex frequency variable, so that the output of said device ($V_{OUT}$) is of the form $$\frac{V_{OUT}}{V_{IN}} = (1+AK)\frac{(s+a)(s+c)}{(s+b)(s+d)}$$

14. The circuitry in claim 13 wherein said buffer amplifier means are single-ended and non-inverting.

* * * * *